US009240154B2

(12) United States Patent
Park et al.

(10) Patent No.: US 9,240,154 B2
(45) Date of Patent: Jan. 19, 2016

(54) LIQUID CRYSTAL DISPLAY

(75) Inventors: Mangyu Park, Seoul (KR); Jincheol Hong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 833 days.

(21) Appl. No.: 13/240,428

(22) Filed: Sep. 22, 2011

(65) Prior Publication Data

US 2012/0098813 A1 Apr. 26, 2012

(30) Foreign Application Priority Data

Oct. 25, 2010 (KR) ........................ 10-2010-0103921

(51) Int. Cl.
*G06F 3/038* (2013.01)
*G09G 5/00* (2006.01)
*G09G 3/36* (2006.01)

(52) U.S. Cl.
CPC ............ *G09G 3/3677* (2013.01); *G09G 3/3611* (2013.01); *G09G 3/3688* (2013.01); *G09G 2310/0251* (2013.01); *G09G 2310/0281* (2013.01); *G09G 2310/0289* (2013.01); *G09G 2310/08* (2013.01); *G09G 2330/021* (2013.01); *G09G 2370/08* (2013.01)

(58) Field of Classification Search
CPC ........................................................ G09G 3/36
USPC .......................................................... 345/211
See application file for complete search history.

(56) References Cited

U.S. PATENT DOCUMENTS

| | | | | |
|---|---|---|---|---|
| 7,948,465 | B2 * | 5/2011 | Cho et al. | 345/99 |
| 2007/0242019 | A1 * | 10/2007 | Jung et al. | 345/98 |
| 2008/0001892 | A1 * | 1/2008 | Kim et al. | 345/97 |
| 2009/0058788 | A1 * | 3/2009 | Ha et al. | 345/99 |

FOREIGN PATENT DOCUMENTS

| | | | |
|---|---|---|---|
| CN | 101059941 | A | 10/2007 |
| CN | 101377908 | A | 3/2009 |
| KR | 20070102954 | A | 10/2007 |
| KR | 20090061458 | A | 6/2009 |

OTHER PUBLICATIONS

Office Action issued in corresponding Chinese Patent Application No. 201110327820.8, mailed Aug. 5, 2013, 14 pages.
Office Action issued in corresponding Korean Patent Application No. 10-2010-0103921, mailed Apr. 22, 2013.

* cited by examiner

*Primary Examiner* — Nicholas Lee
(74) *Attorney, Agent, or Firm* — Brinks Gilson & Lione

(57) ABSTRACT

A liquid crystal display comprises: a first data drive circuit that supplies a data voltage to data lines present in a first portion and a third portion on the screen of a liquid crystal display panel in response to a first source output enable signal; and a second data drive circuit that supplies the data voltage to data lines present in a second portion and a fourth portion on the screen of the liquid crystal display panel in response to a second source output enable signal. The first source output enable signal controls the data voltage output timing and charge sharing timing of the first data drive circuit. The second source output signal controls the data output timing and charge sharing timing of the second data drive circuit in a different way from the first data drive circuit.

20 Claims, 18 Drawing Sheets

LIQUID CRYSTAL DISPLAY

This application claims the priority and the benefit under 35 U.S.C. §119(a) on Patent Application No. 10-2010-0103921 filed in Republic of Korea on Oct. 25, 2010 the entire contents of which are hereby incorporated by reference.

BACKGROUND

1. Field of the Invention

This document relates to a liquid crystal display.

2. Discussion of the Related Art

An active matrix driving type liquid crystal display displays moving pictures by using a thin film transistor (hereinafter, "TFT") as a switching element. The liquid crystal display is small-sized compared to a cathode ray tube (CRT), and hence is rapidly replacing the cathode ray tube (CRT) in televisions, as well as displays of mobile information devices, office machines, computers, etc.

A liquid crystal display comprises a liquid crystal display panel, a backlight unit irradiating light onto the liquid crystal display panel, a source drive integrated circuit (IC) supplying a data voltage to data lines of the liquid crystal display panel, a gate drive IC supplying a gate pulse (or scan pulse) to gate lines (or scan lines) of the liquid crystal display panel, a control circuit controlling the above ICs, a light source driving circuit driving a light source of the backlight unit, and the like.

As the source drive IC outputs a relatively high analog voltage, its power consumption and heat generation are high. The source drive IC requires measures for reducing the high power consumption and heat generation. However, the operation timing of the source drive IC should be in synchronization with the operation timing of the gate drive IC, and the amount of delay of control signals for controlling the drive ICs varies depending on the position of the drive ICs, thereby making it difficult to achieve an optimum design for reducing the power consumption and heat generation of all source drive ICs.

BRIEF SUMMARY

A liquid crystal display comprises: a liquid crystal display panel having data lines and gate lines crossing each other and a matrix of liquid crystal cells arranged by the crossing structure of the lines; a first gate drive circuit that sequentially supplies a gate pulse to the gate lines present in a first portion and a second portion on the screen of the liquid crystal display panel in response to a gate output enable signal; a second gate drive circuit that sequentially supplies the gate pulse to the gate lines present in a third portion and a fourth portion on the screen of the liquid crystal display panel in response to the gate output enable signal; a first data drive circuit that supplies a data voltage to the data lines present in the first portion and the third portion on the screen of the liquid crystal display panel in response to a first source output enable signal; a second data drive circuit that supplies the data voltage to the data lines present in the second portion and the fourth portion below the second portion on the screen of the liquid crystal display panel in response to a second source output enable signal; and a timing controller that generates the gate output enable signal, the first source output enable signal, and the second source output enable signal to control the gate pulse output timing of the gate drive circuits and the data voltage output timing and charge sharing timing of the data drive circuits.

The second portion is apart from the first portion in a horizontal direction. The third portion is apart from the first portion in a vertical direction. The fourth portion is apart from the third portion in the horizontal direction.

The first source output enable signal controls the data output timing and charge sharing timing of the first data drive circuit. The second source output enable signal controls the data output timing and charge sharing timing of the second data drive circuit in a different way from the first data drive circuit.

BRIEF DESCRIPTION OF THE DRAWINGS

The implementation of this document will be described in detail with reference to the following drawings in which like numerals refer to like elements.

DETAILED DESCRIPTION OF THE DRAWINGS AND THE PRESENTLY PREFERRED EMBODIMENTS

Figure 1:
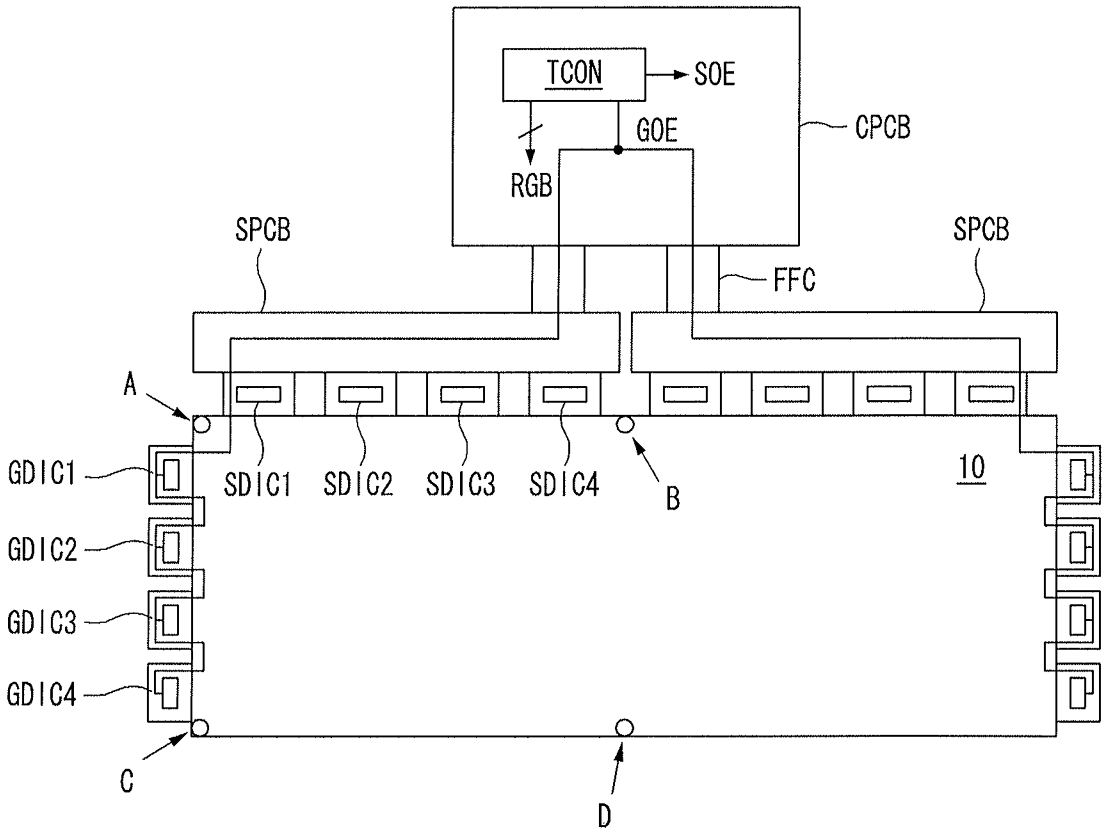
FIG. 1 is a view showing a liquid crystal display according to an exemplary embodiment of the present invention.

Hereinafter, exemplary embodiments of the present invention will be described in detail with reference to the attached drawings. Throughout the specification, the same reference numerals indicate substantially the same components. Further, in the following description, well-known functions or constructions related to the present invention will not be described in detail if it appears that they could obscure the invention in unnecessary detail.

Figure 2:
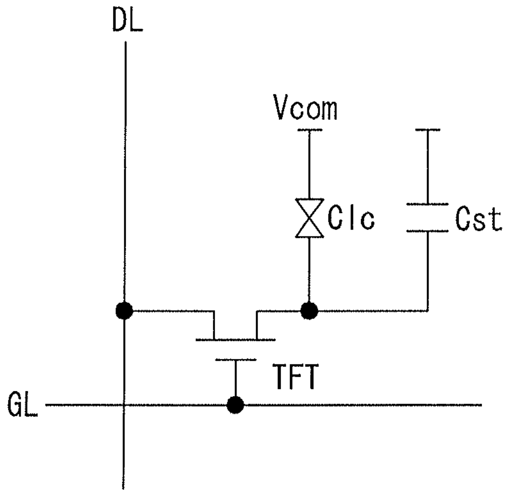
FIG. 2 is an equivalent diagram showing a pixel of the liquid crystal display panel shown in FIG. 1.

Referring to FIGS. 1 and 2, a liquid crystal display according to an exemplary embodiment of the present invention comprises a liquid crystal display panel 10 having a pixel array, a data drive circuit for supplying a data voltage to data lines DL of the liquid crystal display panel 10, a gate drive circuit for sequentially supplying a gate pulse (or scan pulse)

to gate lines GL of the liquid crystal display panel 10, a timing controller TCON for controlling the operation timings of the data and gate drive circuits, and the like. A backlight unit for uniformly irradiating light to the liquid crystal display panel may be disposed under the liquid crystal display panel 10.

The liquid crystal display panel 10 comprises a TFT (thin film transistor) array substrate and a color filter array substrate facing each other with a liquid crystal layer interposed therebetween. The TFT array substrate comprises data lines DL, gate lines GL crossing the data lines DL, and pixels formed in pixel areas defined by the data lines DL and the gate lines GL. Each pixel comprises R, G, and B subpixels, and each subpixel comprises TFTs formed in the crossings of the data lines DL and the gate lines GL, liquid crystal cells Clc connected to the TFTs, storage capacitors Cst connected to pixel electrodes of the liquid crystal cells Clc, and the like. A black matrix, color filters, and common electrodes are formed on the color filter array substrate. The common electrodes formed in all the pixels are electrically connected together, and a common voltage Vcom is applied to the common electrodes. In a vertical electric field driving scheme such as a twisted nematic (TN) mode or a vertical alignment (VA) mode, the common electrodes are formed on an upper glass substrate. On the other hand, in a horizontal electric field driving scheme such as an in-plane switching (IPS) mode or a fringe field switching (FFS) mode, the common electrodes are formed on a lower glass substrate together with the pixel electrodes. Polarizers are attached to the TFT array substrate and the color filter array substrate, respectively, and an alignment film for setting a pre-tilt angle of liquid crystal is formed thereon.

The liquid crystal display panel 10 may be implemented in any liquid crystal mode, as well as in the TN mode, the VA mode, the IPS mode, and the FFS mode. The liquid crystal display of the present invention may be implemented in any form, including a transmissive liquid crystal display, a semi-transmissive liquid crystal display, and a reflective liquid crystal display. The transmissive liquid crystal display and the semi-transmissive liquid crystal display require a backlight unit. The backlight unit may be implemented as a direct type backlight unit or an edge type backlight unit.

The data drive circuit comprises a plurality of source drive ICs SDIC1 to SDIC4. The gate drive circuit comprises a plurality of gate drive ICs GDIC1 to GDIC4.

The timing controller TCON is mounted on a control printed circuit board CPCB. The timing controller TCON receives digital video data RGB from an external host system through an interface, such as an LVDS (Low Voltage Differential Signaling) interface and a TMDS (Transition Minimized Differential Signaling) interface. The timing controller TCON transmits the digital video data RGB received from the host computer to the source drive ICs SDIC1 to SDIC4. A DC-DC converter (not shown) may be mounted on the control printed circuit board CPCB. The DC-DC converter generates analog driving voltages to be supplied to the liquid crystal display panel 10. The driving voltages include positive/negative gamma reference voltages, a common voltage Vcom, a gate high voltage VGH, a gate low voltage VGL, etc. The control printed circuit board CPCB is electrically connected to a source printed circuit board SPCB via a flexible flat cable (FFC).

The timing controller TCON receives timing signals, such as a vertical sync signal Vsync, a horizontal sync signal Hsync, a data enable signal DE, and a main clock MCLK, from a host system through an LVDS or TMDS interface receiving circuit. The timing controller TCON generates timing control signals for controlling the operation timings of the source drive ICs SDIC1 to SDIC4 and gate drive ICs GDIC1 to GDIC4 with reference to timing signals from the host system. The timing control signals include gate timing control signals for controlling the operation timing of the gate drive ICs GDIC1 to GDIC4 and data timing control signals for controlling the operation timing of the source drive ICs SDIC1 to SDIC4 and the polarity of a data voltage.

The gate timing control signals include a gate start pulse GSP, a gate shift clock GSC, a flicker control signal FLK, a gate output enable signal GOE, etc. The gate start pulse GSP controls the output timing of the first gate pulse input to the first gate drive IC GDIC1 and output from the first gate drive IC GDIC1. The gate shift clock GSC controls the shift timing of the gate start pulse GSP. The flicker control signal FLK controls a modulation timing for modulating the gate high voltage VGH to a low level at the falling edge of a gate pulse to reduce flicker. The gate output enable signal GOE controls the output timing of the gate drive ICs GDIC1 to GDIC4. The gate timing control signals are transmitted to the gate drive ICs GDIC1 to GDIC4 through gate timing control signal bus lines formed on the control printed circuit board CPCB, an FFC, gate timing control signal bus lines formed on the source printed circuit board SPCB, a gate timing control signal bus line formed on the TCP of at least one of the source drive ICs SDIC1 to SDIC4, and LOG (Line On Glass) lines formed on the TFT array substrate of the liquid crystal display panel 10.

The data timing control singles include a source start pulse SSP, a source sampling clock SSC, a polarity control signal POL, a source output enable signal SOE, etc. The source start pulse SSP controls the shift start timing of the source drive ICs SDIC1 to SDIC4. The source sampling clock SSC controls a sampling timing of data in the source drive ICs SDIC1 to SDIC4. The polarity control signal POL controls the polarity of the data voltages output from the source drive ICs SDIC1 to SDIC4. The source output enable signal SOE controls the data voltage output timing and charge sharing timing of the source drive ICs SDIC1 to SDIC4. If the data transmission interface between the timing controller TCON and the source drive ICs SDIC1 to SDIC4 is a mini LVDS interface, the source start pulse SSP and the source sampling clock SSC may be omitted. The data timing control signals are transmitted to the source drive ICs SDIC1 to SDIC4.

Each of the source drive ICs SDIC1 to SDIC4 receives digital video data from the timing controller TCON. The source drive ICs SDIC1 to SDIC4 convert the digital video data into positive/negative analog data voltages in response to a source timing control signal from the timing controller TCON and supplies the converted positive/negative analog data voltages to the data lines DL of the liquid crystal display panel 10. Each of the source drive ICs SDIC1 to SDIC4 may be bonded onto the TFT array substrate of the liquid crystal display panel 10 by a COG (Chip On Glass) process. The source drive ICs SDIC1 to SDIC4 may be mounted on a TCP (Tape Carrier Package) and bonded to the TFT array substrate of the liquid crystal display panel 10 and to the source printed circuit board SPCB by a TAB (Tape Automated Bonding) process The gate drive ICs GDIC1 to GDIC4 sequentially supply a gate pulse to the gate lines GL of the liquid crystal display panel 10 in response to a gate timing control signal from the timing controller TCON. The gate pulse swings between the gate high voltage VGH and the gate low voltage VGL. The gate high voltage VGH is set to a level higher than the threshold voltage of the TFTs formed at the TFT array of the liquid crystal display panel 10; whereas the gate low voltage VGL is set to a level lower than the threshold voltage of the TFTs formed at the TFT array of the liquid crystal display panel 10.

Figure 11:
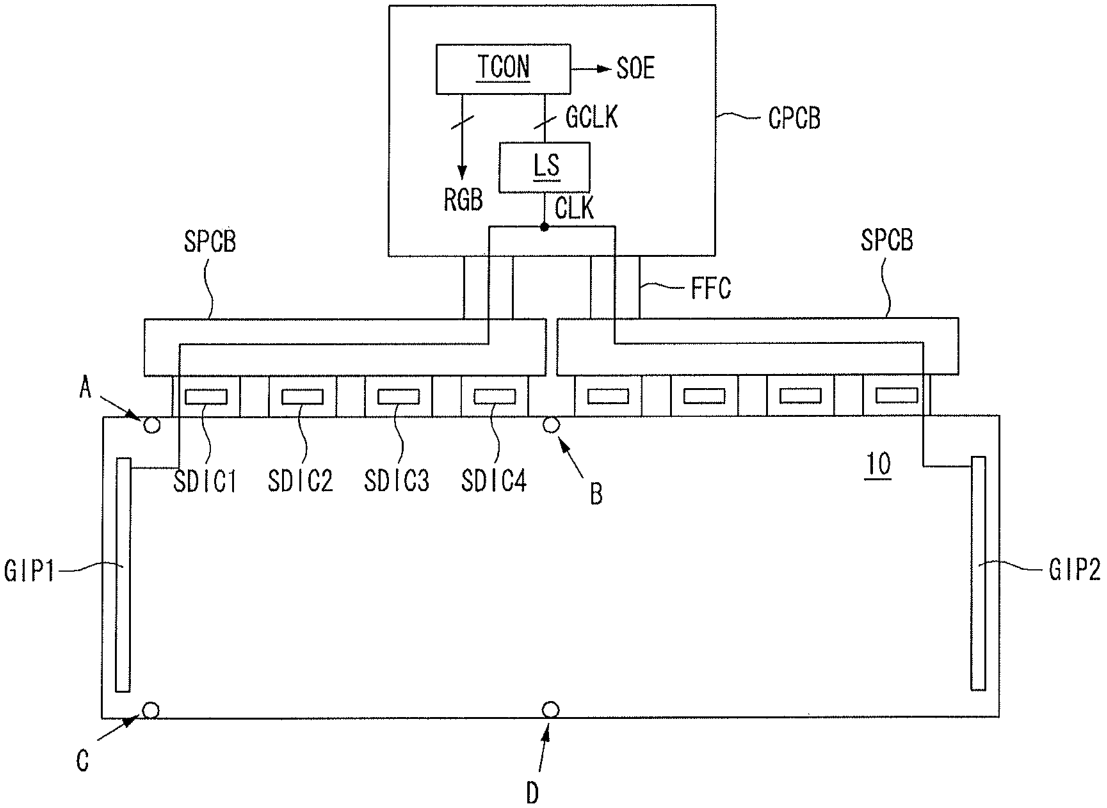
FIG. 11 is a view showing a liquid crystal display according to another exemplary embodiment of the present.
Figure 12:
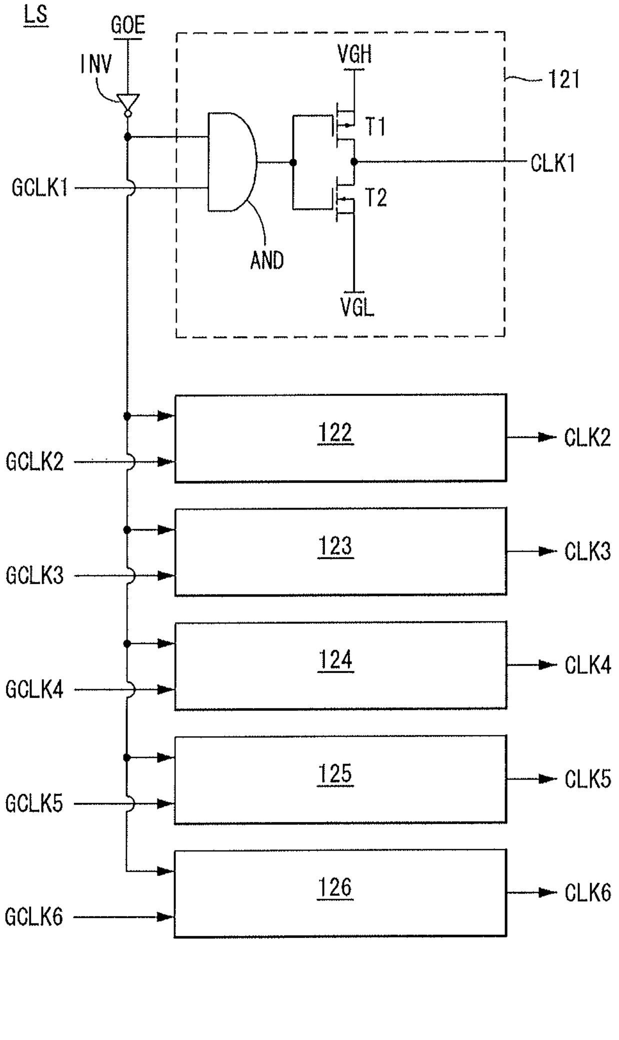
FIG. 12 is a circuit diagram showing in detail the level shifter LS shown in FIG. 11.

Accordingly, the TFTs of the TFT array are turned on in response to the gate pulse from the gate lines G to supply a data voltage from the data lines DL to the pixel electrodes of the liquid crystal cells Clc. The gate drive ICs GDIC1 to GDIC4 may be mounted on a TCP and bonded to the TFT array substrate of the liquid crystal display panel 10 by a TAB process. As shown in FIG. 1, the gate drive circuit may be bonded to both side edges of the liquid crystal display panel 10 to apply a gate pulse simultaneously to both ends of the gate lines GL, thus reducing the delay of the gate pulse. Alternatively, the gate drive circuit may be bonded to a side edge of the liquid crystal display panel 10 to apply the gate pulse to the side edge of the liquid crystal display panel 10. The gate drive circuit may be implemented as a GIP circuit directly formed on the TFT substrate, simultaneously with the TFT array, by a GIP (Gate In Panel) process as shown in FIGS. 11 and 12.

Figure 3:
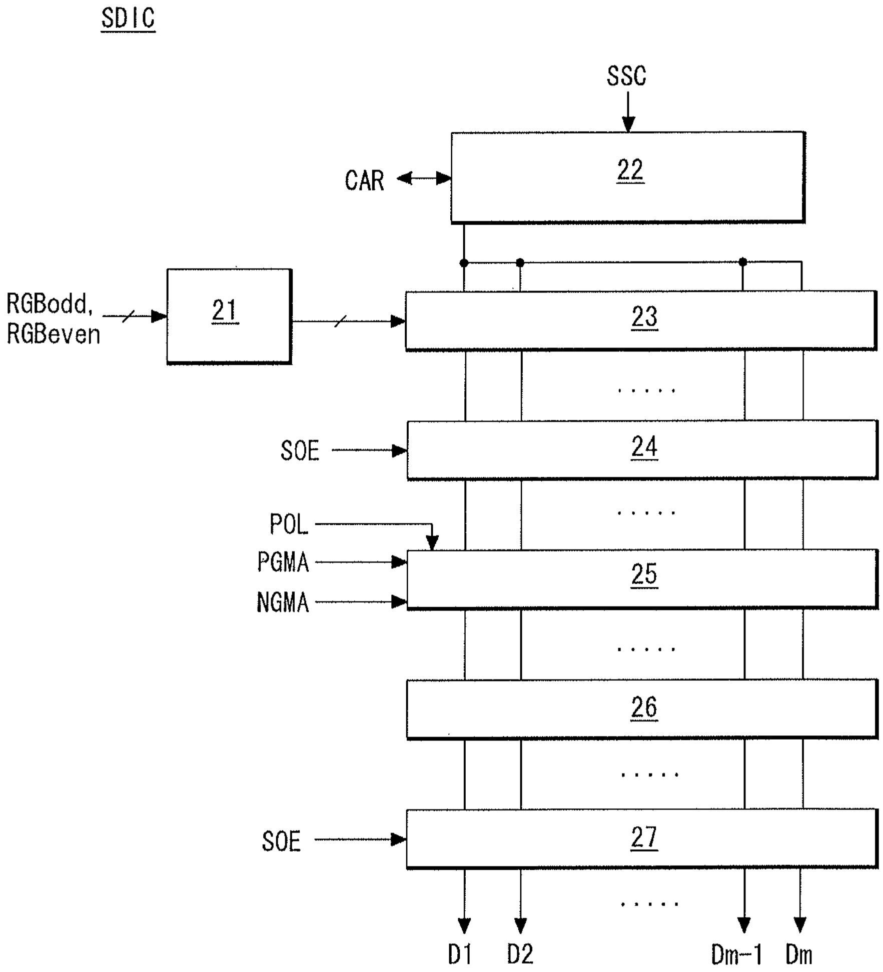
FIG. 3 is a view showing in detail a source drive IC shown in FIG. 1.

FIG. 3 is a view showing a circuit configuration of the source drive ICs SDIC1 to SDIC4.

Referring to FIG. 3, each of the source drive ICs SDIC1 to SDIC4 drives m (m is a natural number) data lines D1 to Dm, and comprises a data restoring unit 21, a shift register 22, a first latch array 23, a second latch array 24, a digital-to-analog converter (hereinafter, referred to as "DAC") 25, an output buffer 26, a charge share circuit 27, and the like.

The data restoring unit 21 restores the digital video data RGBodd and RGBeven received in the mini LVDS interface manner to supply the digital video data RGBodd and RGBeven to the first latch array 23. The shift register 22 shifts a sampling signal according to the source sampling clock SSC. When data exceeding the number of latch operations in the first latch array 23 is supplied to the first latch array 22, the shift register 22 generates a carry signal CAR.

The first latch array 22 samples and latches the digital video data RGBodd and RGBeven serially received from the data restoring unit 21 in response to the sampling signal sequentially received from the shift register 22, and then simultaneously outputs the digital video data RGBodd and RGBeven to convert the digital video data in serial format into digital video data in parallel format. The second latch array 24 latches the data received from the first latch array 23. Then, the second latch array 24 and the second latch arrays 24 of the other source drive ICs simultaneously output the latched digital video data.

The DAC 25 converts the digital video data received from the second latch array 24 into a positive analog data voltage and a negative analog data voltage using positive gamma reference voltages PGMA and negative gamma reference voltages NGMA. Further, the DAC 25 selects and outputs the positive data voltage and the negative data alternately according to a logic value of the polarity control signal POL.

The output buffer 26 minimizes signal attenuation of the data voltage supplied to the data lines D1 to Dm. The charge share circuit 27 supplies positive/negative data voltages to the data lines D1 to Dm during a low logic period of the source output enable signal SOE and shorts neighboring data output channels of the source drive ICs SDIC1 to SDIC4 to output an average value of the positive and negative data voltage to the data lines D1 to Dm during a high logic period of the source output enable signal SOE.

The arrangement and operational relationship of the source drive ICs SDIC1 to SDIC4 will now be discussed. The first source drive IC SDIC1 is disposed on the left side of the screen, and the second to fourth source drive ICs SDIC2 to SDIC4 are disposed in order to the right of the first source drive IC SDIC1. The first source drive IC SDIC1 supplies a data voltage to the data lines disposed at a left portion including A and C of the screen, and the fourth source drive IC SDIC4 supplies a data voltage to the data lines disposed at a center (or right) portion including B and D of the screen. The portion B is apart from the portion A in a horizontal direction. The portion C is apart from the portion A in a vertical direction. The portion D is apart from the portion C in the horizontal direction and apart from the portion B in the vertical direction. The second and third source drive ICs SDIC2 and SDIC3 supply the data voltage to the data lines disposed between A/C and B/D.

The first source drive IC SDIC1 sequentially samples serial data corresponding to its number of data output channels in response to the source start pulse SSP or a reset clock embedded in a mini LVDS clock, and then transmits a first carry signal CAR to the second source drive IC SDIC2. The second source drive IC SDIC2 samples data corresponding to its number of data output channels in response to the first carry signal CAR from the first source drive IC SDIC1, and then transmits a second carry signal CAR to the third source drive IC SDIC3. The third source drive IC SDIC3 samples data corresponding to its number of data output channels in response to the second carry signal CAR from the second source drive IC SDIC2, and then transmits a third carry signal CAR to the fourth source drive IC SDIC4. The fourth source drive IC SDIC4 samples data corresponding to its number of data output channels in response to the third carry signal CAR from the third source drive IC SDIC3. In this way, the source drive ICs SDIC1 to SDIC4 sequentially sample and latch serial input data to convert the data in serial format into data in parallel format, and then simultaneously output the data in response to the source output enable signal SOE.

Figure 4:
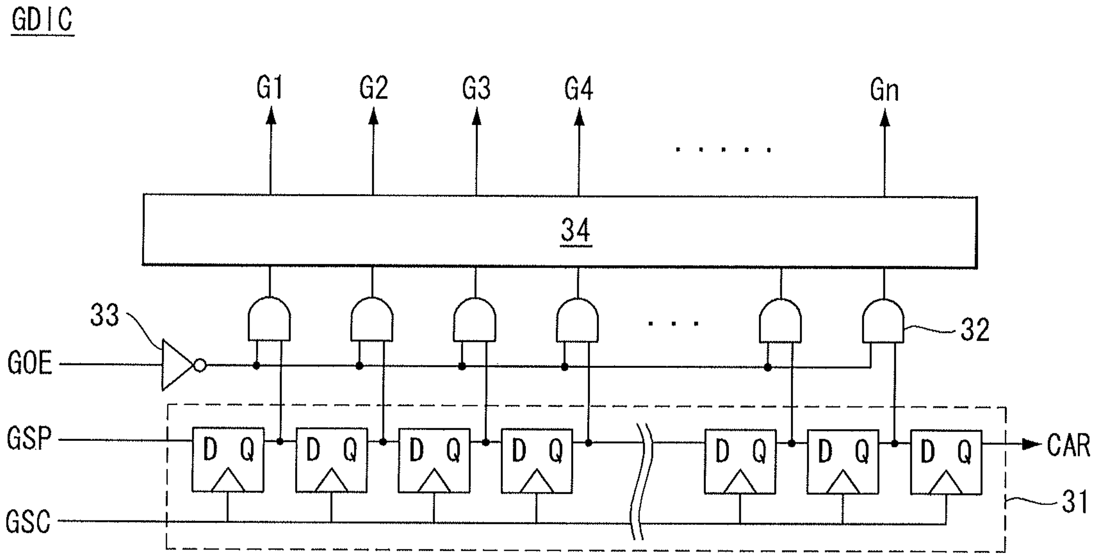
FIG. 4 is a view showing in detail a gate drive IC shown in FIG. 1.
Figure 5A:
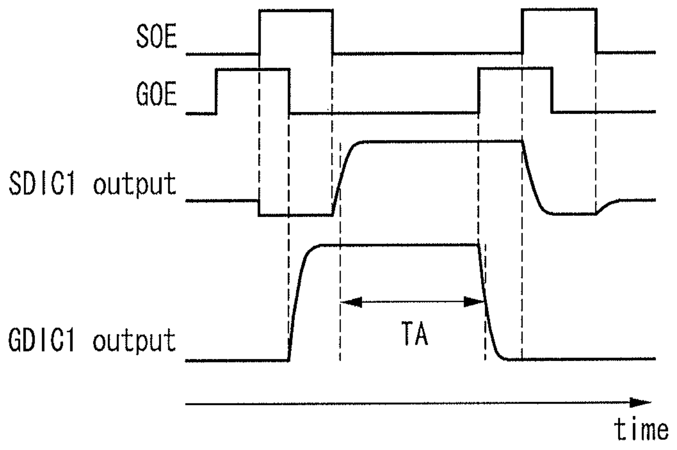
FIGS. 5*a* to 5*d* are waveform diagrams showing a source output enable signal and a gate output enable signal which control the output timings of the source drive ICs and gate drive ICs for driving screen portions A, B, C, and D shown in FIG. 1.
Figure 5B:
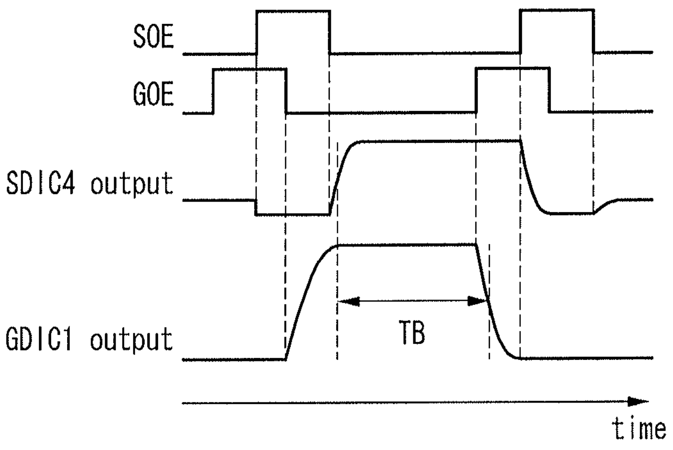
Figure 5C:
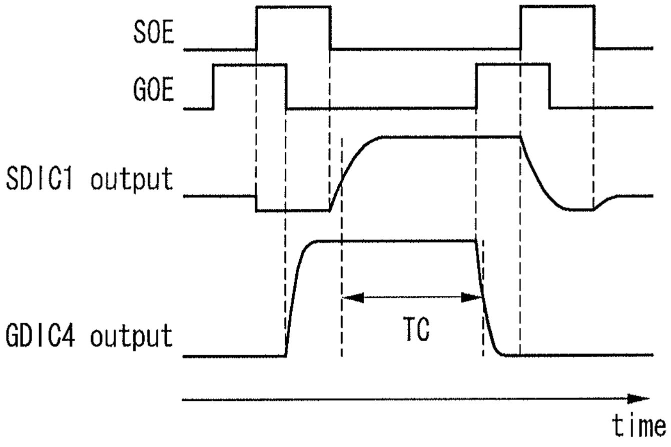
Figure 5D:
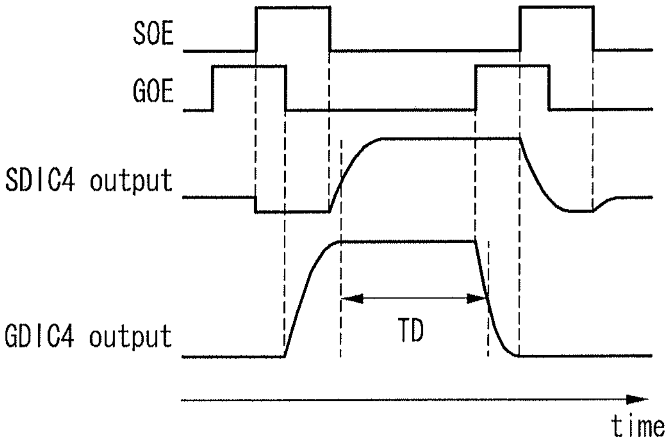

FIG. 4 is a view showing a circuit configuration of the gate drive ICs GDIC1 to GDIC4.

As shown in FIG. 4, each of the gate drive ICs comprises a shift register 31, a level shifter 34, a plurality of AND gates 32 connected between the shift register 31 and the level shifter 34, and the like.

The shift register 31 sequentially shifts the gate start pulse GSP in response to the gate shift clock GSC using a plurality of cascade-connected D flip-flops and then generates a carry signal CAR. Each of the AND gates 32 outputs AND operation result of an output signal of the shift register 31 and the gate output enable signal GOE inverted by an inverter 33.

The level shifter 34 shifts the swing width of an output voltage of the AND gates 32 to a swing width between the gate high voltage VGH and the gate low voltage VGL, and sequentially supplies the output voltage to the gate lines G1 to Gn. The level shifter 34 is positioned in the front of the shift register 31.

The arrangement and operational relationship of the gate drive ICs GDIC1 to GDIC4 will now be discussed. The first gate drive IC GDIC1 is disposed on the upper end of the screen, and the second to fourth gate drive ICs GDIC2 to GDIC4 are sequentially disposed below the first gate drive IC GDIC1. The first gate drive IC GDIC1 sequentially supplies a gate pulse to the gate lines disposed at an upper end portion including A and B of the screen, and the fourth gate drive IC GDIC4 sequentially supplies the gate pulse to the gate lines disposed at a lower end portion including C and D of the screen. The second and third gate drive ICs GDIC2 and GDIC3 sequentially supply the gate pulse to the gate lines disposed between A/B and C/D on the screen.

The first gate drive IC GDIC1 sequentially outputs the gate pulse to the gate lines by shifting the gate start pulse SSP in synchronization with the rising edge of the gate shift clock GSC, and then outputs a first carry signal CAR as the start pulse of the second gate drive IC GDIC2. The second gate drive IC GDIC2 sequentially outputs the gate pulse to the gate lines by shifting the first carry signal CAR in synchronization with the rising edge of the gate shift clock GSC, and then outputs a second carry signal CAR as the start pulse of the third gate drive IC GDIC3. The third gate drive IC GDIC3 sequentially outputs the gate pulses to the gate lines by shifting the second carry signal CAR in synchronization with the rising edge of the gate shift clock GSC, and then outputs a third carry signal CAR as a start pulse of the fourth gate drive IC GDIC4. The fourth gate drive IC GDIC4 sequentially outputs the gate pulse to the gate lines by shifting the third carry signal CAR in synchronization with the rising edge of the gate shift clock GSC.

FIGS. 5*a* to 5*d* are waveform diagrams showing the source output enable signal SOE, the gate output enable signal GOE, the output of the source drive ICs SDIC1 to SDIC4, and the output of the gate drive ICs GDIC1 to GDIC4 depending on positions on the screen.

Referring to FIGS. 5*a* to 5*d*, TA denotes the data charge time of the liquid crystal cells Clc present in the portion A, TB denotes the data charge time of the liquid crystal cells Clc present in the portion B, TC denotes the data charge time of the liquid crystal cells Clc present in the portion C, and TD denotes the data charge time of the liquid crystal cells Clc present in the portion D, respectively.

The data voltage output from the source drive ICs SDIC1 to SDIC4 and the gate pulse output from the gate drive ICs GDIC1 to GDIC4 are delayed by RC delay caused by the line resistance of the data lines and the gate lines and the capacitance of the liquid crystal display panel 10. Accordingly, the data charge amount of the liquid crystal cells Clc varies with pixel position as the delay time of the data voltage and the gate pulse varies depending on pixel position on the liquid crystal display panel 10. For example, the portion having the worst data charging characteristics of the liquid crystal cells Clc, among the screen portions A, B, C, and D of FIG. 1, is the portion C (see FIG. 5*c*) in which the output delay time of the source drive ICs is long and the output delay time of the gate drive ICs is short. On the other hand, the portion having the best data charging characteristics of the liquid crystal cells Clc is the portion B (see FIG. 5*b*) where the output delay time of the source drive ICs is short and the output delay time of the gate drive ICs is long. The charging characteristics of the liquid crystal cells Clc present in the portions A and D are better than those of the liquid crystal cells Clc present in the portion C and worse than those of the liquid crystal cells Clc present in the portion B.

The operation timing of the source drive ICs SDIC1 to SDIC4 and the operation timing of the gate drive ICs GDIC1 to GDIC4 may be tuned with respect to the portion having the worst charging characteristics on the liquid crystal display panel 10. For instance, if the optimum timings of the source output enable signal SOE and the gate output enable signal GOE are determined based on the portion C having the worst data charging characteristics of the liquid crystal cells Clc and applied to all the portions of the screen, the power consumption and temperature of the source drive ICs SDIC1 to SDIC4 for driving the portions A, B, and D other than the portion C cannot be optimized. The power consumption and temperature of the source drive ICs SDIC1 to SDIC4 can be improved by extending the charge sharing timing.

Figure 6:
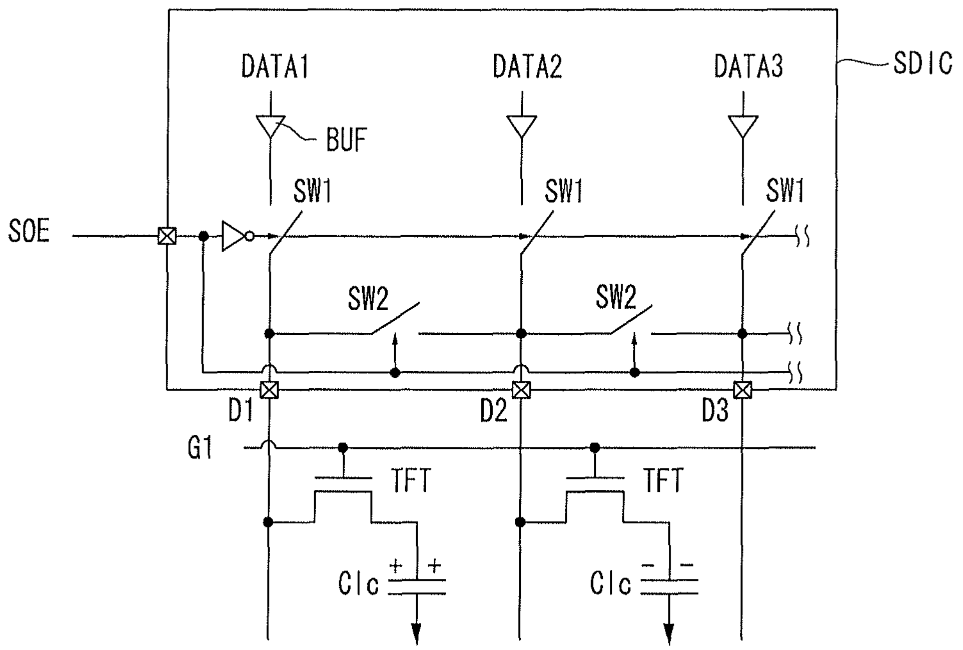
FIG. 6 is a view showing in detail the charge share circuit shown in FIG. 3.
Figure 7:
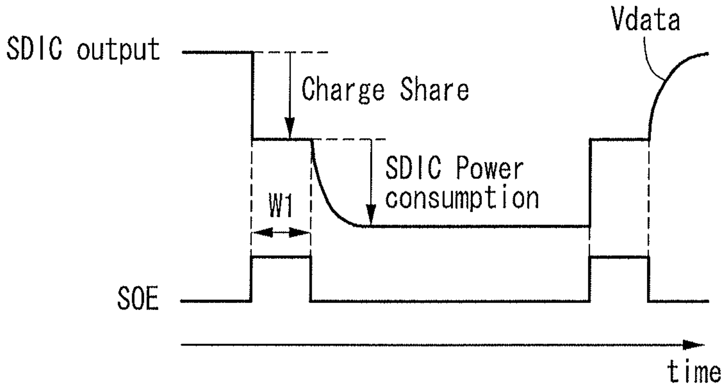
FIG. 7 is a timing diagram showing the source output enable signal and the charge share operation timing.

FIG. 6 is a view showing in detail the charge share circuit 27 shown in FIG. 3. FIG. 7 is a timing diagram showing the source output enable signal and the charge share operation timing.

Referring to FIGS. 6 and 7, the charge share circuit 27 of the source drive ICs SDIC1 to SDIC4 comprises first switches SW1 connected in series between output buffers BUF and data output channels and second switches SW2 connected between neighboring data output channels. The data output channels of the source drive ICs SDIC1 to SDIC4 are connected one to one to the data lines D1 to D3 of the liquid crystal display panel 10 to supply positive/negative data voltages from the output buffers BUF to the data lines D1 to D3.

Each of the first switches SW1 is turned on during a low logic period of the source output enable signal SOE to supply a data voltage to the data lines D1 to D3. On the other hand, the first switches SW1 are turned off during a high logic period of the source output enable signal SOE to connect a current path between the output buffers BUF and the data lines D1 to D3. Accordingly, the source drive ICs SDIC1 to SDIC4 output a positive/negative data voltage during a low logic period (or pulse off period) of the source output enable signal SOE. At this point, an electric current is generated in proportion to the swing width of the data voltage, resulting in power consumption.

Each of the second switches SW2 is turned on during a high logic period of the source output enable signal SOE to connect the neighboring data output channels and configure the data lines D1 to D3 as a short circuit. Data voltages of opposite polarities are supplied to neighboring data lines. As a result, the data lines are controlled to have an average voltage of the positive data voltage and the negative data voltage due to charge sharing between the positive data voltage and the negative data voltage during a high logic period (or pulse on period W1) of the source output enable signal SOE. Since there is almost no electric current generated in the source drive ICs SDIC1 to SDIC4 during the charge sharing time of the data lines, their power consumption is reduced. On the other hand, the second switches SW2 are turned off during a low logic period of the source output enable signal SOE to disconnect a current path between the neighboring data output channels.

As can be seen from FIGS. 6 and 7, the power consumption of the source drive ICs SDIC1 to SDIC4 can be reduced by extending charge sharing time determined by the source output enable signal SOE. The data charge time of the liquid crystal cells becomes shorter as the charge sharing time becomes longer. Hence, the charge sharing time should be optimized by taking the data charge time of the liquid crystal cells into account.

The charge sharing between the source drive ICs SDIC1 to SDIC4 has a significant effect on the temperature of the source drive ICs SDIC1 to SDIC4 as well as on the power consumption of the source drive ICs SDIC1 to SDIC4. Less electric current is generated in the source drive ICs SDIC1 to SDIC4 during the charge sharing time. Accordingly, the temperature of the source drive ICs SDIC1 to SDIC4 can be reduced by extending the charge sharing time.

Figure 8:
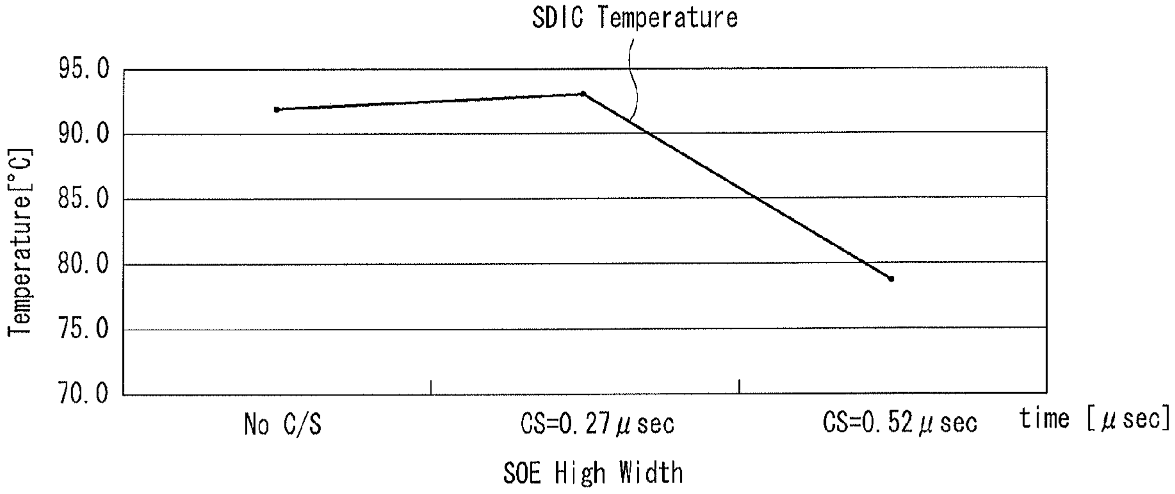
FIG. 8 is a diagram of a test result showing that the temperature of the source drive ICs changes with variations in charge sharing time.
Figure 9A:
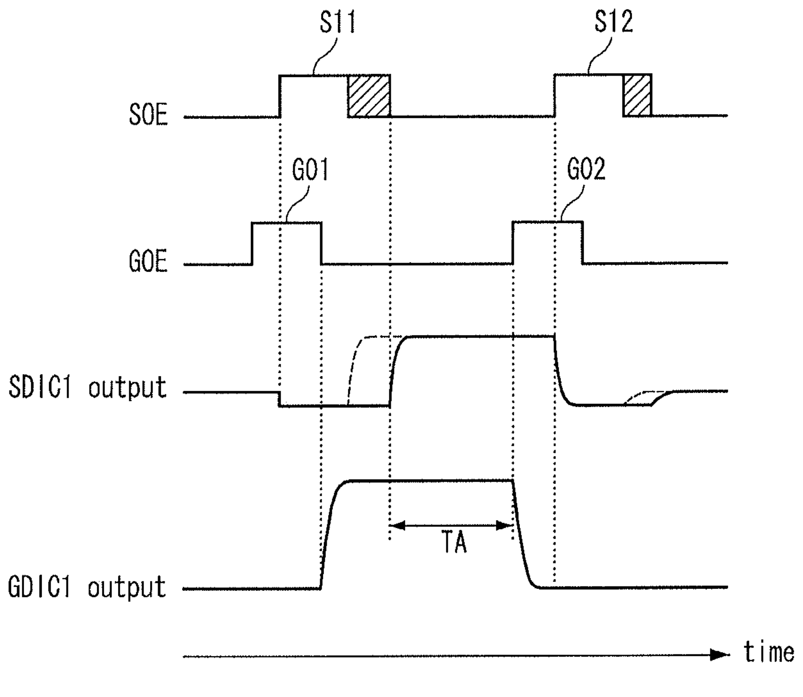
FIGS. 9*a* to 9*d* are waveform diagrams showing the source output enable signal and gate output enable signal of the present invention which control the output timings of the source drive ICs and gate drive ICs for driving the screen portions A, B, C, and D shown in FIG. 1.
Figure 9B:
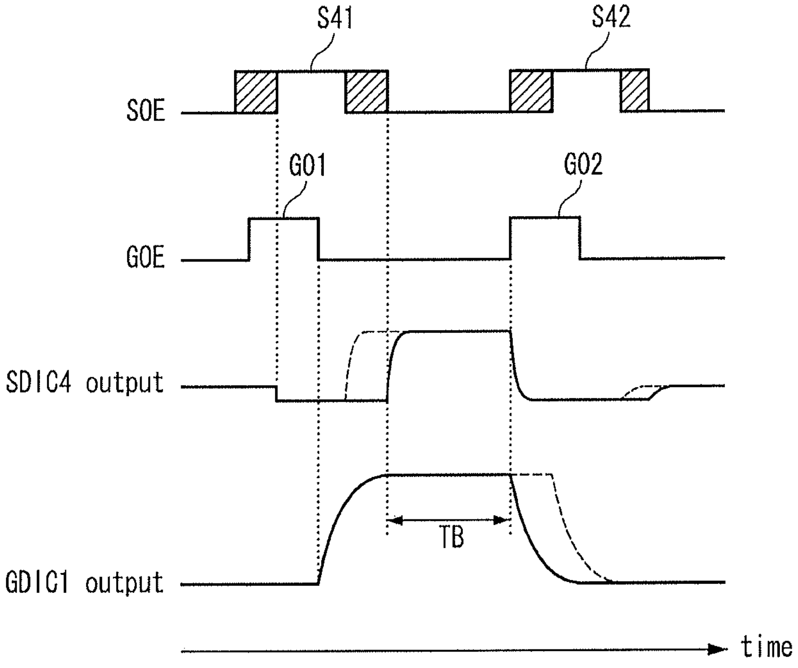
Figure 9C:
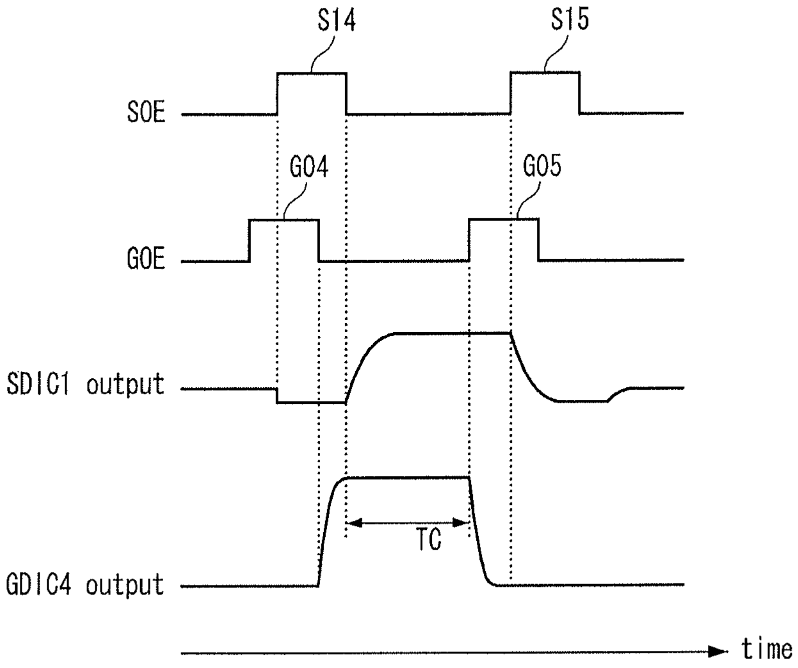
Figure 9D:
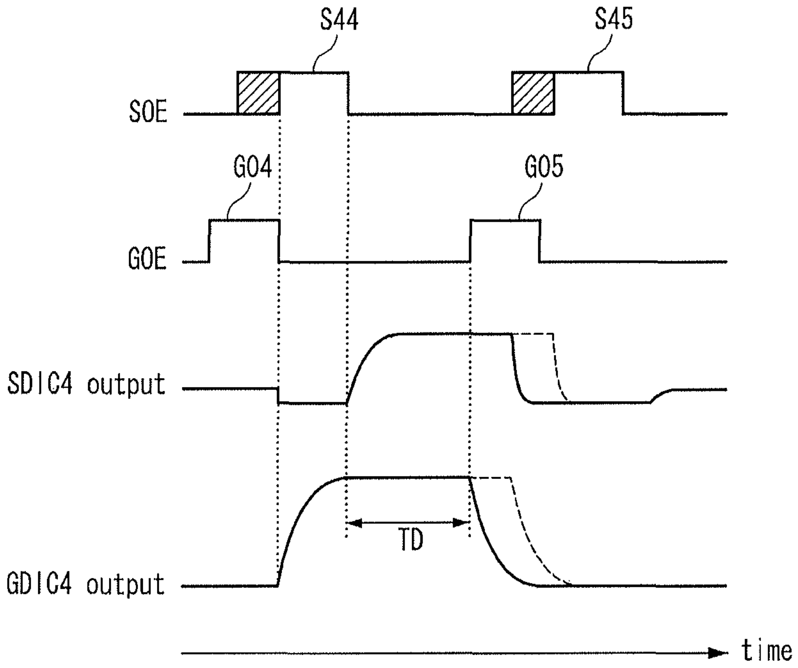

FIG. 8 is a diagram of a test result showing that the temperature of the source drive ICs SDIC1 to SDIC4 changes with variations in charge sharing time. As can be seen from FIG. 8, if the source drive ICs SDIC1 to SDIC4 are driven without any charge sharing, they generate heat at a temperature above 90° C. In contrast, if the source drive ICs SDIC1 to SDIC4 are driven while performing charge sharing, they generate heat at a temperature below 90° C. The longer the charge sharing time, i.e., the longer the pulse width of the source output enable signal SOE, the lower the temperature of the source drive ICs SDIC1 to SDIC4.

As discussed above, if the timings of the source output enable signal SOE and the gate output enable signal GOE are set based on some portion of the screen and the set timings are applied to the entire screen, the power consumption and temperature of the source drive ICs SDIC1 to SDIC4 for driving other portions of the screen are not optimized. The timing controller TCON of the present invention modulates the source output enable signal SOE and the gate output enable signal GOE as shown in FIGS. 9*a* to 9*d* and FIG. 10 in order to optimize the power consumption and temperature of all the source drive ICs SDIC1 to SDIC4.

Figure 10:
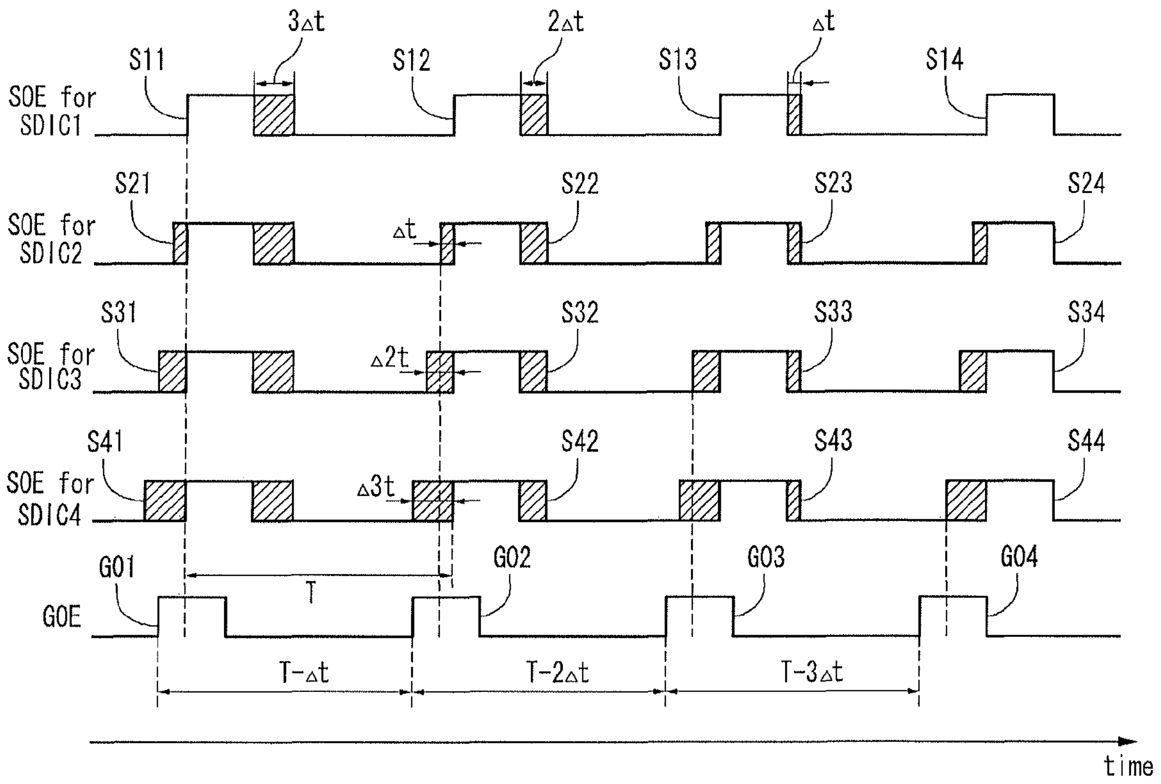
FIG. 10 is a waveform diagram showing the source output enable signal and gate output enable signal which are modulated by the timing controller of the present invention.

FIGS. 9*a* to 9*d* are waveform diagrams showing the source output enable signal and gate output enable signal of the present invention which control the output timings of the source drive ICs SDIC1 to SDIC4 and gate drive ICs GDIC1 to GDIC4 for driving the screen portions A, B, C, and D shown in FIG. 1. FIG. 10 is a waveform diagram showing the source output enable signal and gate output enable signal which are modulated by the timing controller TCON.

Referring to FIGS. 9*a* to 9*d* and FIG. 10, the first source drive IC SDIC1 outputs a data voltage to the data lines disposed in the portions A and C of the screen in response to a first source output enable signal SOE for SDIC1, and shares charge between the data lines. The fourth source drive IC SDIC4 outputs the data voltage to the data lines disposed in the portions B and D of the screen in response to a fourth source output enable signal SOE for SDIC4, and shares charges of the data lines. The second and third source drive ICs SDIC2 and SDIC3 output the data voltage to the data lines disposed in the portion between the portions A/C and B/D of the screen in response to second and third source output enable signals SOE for SDIC2 and SOE for SDIC3.

The first gate drive IC GDIC1 sequentially outputs a gate pulse to the gate lines disposed in the portions A and B of the screen in response to a gate output enable signal GOE. The fourth gate drive IC GDIC4 sequentially outputs the gate pulse to the gate lines disposed in the portions C and D of the screen in response to the gate output enable signal GOE. The second and third gate drive ICs GDIC2 and GDIC3 sequentially output the gate pulse to the gate lines disposed in the portion between the portions A/B and C/D of the screen in response to the gate output enable signal GOE.

The timing controller TCON modulates the pulse width and period of the first to fourth source output enable signals SOE for SDIC1 to SOE for SDIC4 and the period of the gate output enable signal GOE based on the source output enable signal SOE and gate output enable signal GOE for driving the portion C of the screen.

The rising edge timing of the pulses S11 to S15 of the first source output enable signal SOE for SDIC1 is equal to the previous one. In contrast, the falling edge timing of at least some of the pulses S11 to S14 of the first source output enable signal SOE for SDIC1 is modulated to be slower. The first pulse S11 of the first source enable signal SOE for SDIC1 defines the output timing of the data voltage supplied to the data lines present in the portion A of the screen and the charge sharing timing of the data lines. The falling edge timing of the first pulse S11 may be further delayed by approximately 3Δt from the previous one. In this case, the pulse width of the first pulse S11 becomes greater by 3Δt than the previous one (slashed parts of FIGS. 9*a* and 10).

The falling edge timing of the second pulse S12 of the first source output enable signal SOE for SDIC1 is modulated to be slower than the previous one by a modulation width smaller than the modulation width of the first pulse S11. For example, the falling edge timing of the second pulse S12 may be further delayed by approximately 2Δt from the previous one. In this case, the pulse width of the second pulse S12 becomes greater by 2Δt than the previous one (see FIGS. 9*a* and 10).

The falling edge timing of the third pulse S13 of the first source output enable signal SOE for SDIC1 is modulated to be slower than the previous one by a modulation width smaller than the modulation width of the second pulse S12. For example, the falling edge timing of the third pulse S13 may be further delayed by approximately Δt from the previous one. In this case, the pulse width of the third pulse S13 becomes greater by Δt than the previous one (see FIG. 10).

The fourth pulse S14 of the first source output enable signal SOE for SDIC1 defines the output timing of the data voltage supplied to the data lines present in the portion C of the screen and the charge sharing timing of the data lines. The falling edge of the third pulse S13 is modulated by a modulation width smaller than the modulation width of the second pulse S12. For example, the falling edge timing of the third pulse S13 may be set equal to the previous one. In this case, the pulse width of the third pulse S13 is equal to the previous one (see FIGS. 9*c* and 10).

The rising edge timing of at least some of the pulses S21 to S24 of the second source output enable signal SOE for SDIC2 is modulated to be faster than that of the first source output enable signal SOE for SDIC1. The falling edge timing of the pulses S21 to S24 of the second source enable signal SOE for SDIC2 is set equal to that of the first source output enable signal SOE for SDIC1. The rising edge timing of the first pulse S21 of the second source output enable signal SOE for SDIC2 may be set faster by approximately Δt than that of the first pulse S11 of the first source output enable signal SOE for SDIC1. The falling edge timing of the first pulse S21 of the second source output enable signal SOE for SDIC2 may be set equal to that of the first pulse S11 of the first source output enable signal SOE for SDIC1. In this case, the pulse width of the first pulse S21 becomes greater by Δt than that of the first pulse S11 of the first source output enable signal SOE for SDIC1 (see FIG. 10).

The rising edge timing of the second pulse S22 of the second source output enable signal SOE for SDIC2 may be set faster by approximately Δt than that of the second pulse S12 of the first source output enable signal SOE for SDIC1. The falling edge timing of the second pulse S22 of the second source output enable signal SOE for SDIC2 may be set equal to that of the second pulse S12 of the first source output enable signal SOE for SDIC1. In this case, the pulse width of the second pulse S22 becomes greater by Δt than that of the second pulse S12 of the first source output enable signal SOE for SDIC1 (see FIG. 10).

The rising edge timing of the third pulse S23 of the second source output enable signal SOE for SDIC2 may be set faster by approximately Δt than that of the third pulse S13 of the first source output enable signal SOE for SDIC1. The falling edge timing of the third pulse S23 of the second source output enable signal SOE for SDIC2 may be set equal to that of the third pulse S13 of the first source output enable signal SOE for SDIC1. In this case, the pulse width of the third pulse S23 becomes greater by Δt than that of the third pulse S13 of the first source output enable signal SOE for SDIC1 (see FIG. 10).

The rising edge timing of the fourth pulse S24 of the second source output enable signal SOE for SDIC2 may be set faster by approximately Δt than that of the fourth pulse S14 of the first source output enable signal SOE for SDIC1. The falling edge timing of the fourth pulse S24 of the second source output enable signal SOE for SDIC2 may be set equal to that of the fourth pulse S14 of the first source output enable signal SOE for SDIC1. In this case, the pulse width of the fourth pulse S24 becomes greater by Δt than that of the fourth pulse S14 of the first source output enable signal SOE for SDIC1 (see FIG. 10).

The rising edge timing of at least some of the pulses S31 to S34 of the third source output enable signal SOE for SDIC3 is modulated to be faster than that of the second source output enable signal SOE for SDIC2. The falling edge timing of the pulses S31 to S34 of the third source enable signal SOE for SDIC3 is set equal to that of the first and second source output enable signals SOE for SDIC1 and SOE for SDIC2. The rising edge timing of the first pulse S31 of the third source output enable signal SOE for SDIC3 may be set faster by approximately Δt than that of the first pulse S21 of the second source output enable signal SOE for SDIC2. The falling edge timing of the first pulse S31 of the third source output enable signal SOE for SDIC3 may be set equal to that of the first pulses S11 and S21 of the first and second source output enable signals SOE for SDIC1 and SOE for SDIC2. In this case, the pulse width of the first pulse S31 becomes greater by Δt than that of the first pulse S21 of the second source output enable signal SOE for SDIC2 (see FIG. 10).

The rising edge timing of the second pulse S32 of the third source output enable signal SOE for SDIC3 may be set faster by approximately Δt than that of the second pulse S22 of the second source output enable signal SOE for SDIC2. The falling edge timing of the second pulse S32 of the third source output enable signal SOE for SDIC3 may be set equal to that of the second pulses S12 and S22 of the first and second source output enable signals SOE for SDIC1 and SOE for SDIC2. In this case, the pulse width of the second pulse S32 becomes greater by Δt than that of the second pulse S22 of the second source output enable signal SOE for SDIC2 (see FIG. 10).

The rising edge timing of the third pulse S33 of the third source output enable signal SOE for SDIC3 may be set faster by approximately Δt than that of the third pulse S23 of the second source output enable signal SOE for SDIC2. The falling edge timing of the third pulse S33 of the third source output enable signal SOE for SDIC3 may be set equal to that of the third pulses S13 and S23 of the first and second source output enable signals SOE for SDIC1 and SDIC2. In this case, the pulse width of the third pulse S33 becomes greater by Δt than that of the third pulse S23 of the second source output enable signal SOE for SDIC2 (see FIG. 10).

The rising edge timing of the fourth pulse S34 of the third source output enable signal SOE for SDIC3 may be set faster by approximately Δt than that of the fourth pulse S24 of the second source output enable signal SOE for SDIC2. The falling edge timing of the fourth pulse S34 of the third source output enable signal SOE for SDIC3 may be set equal to that of the fourth pulses S14 and S24 of the first and second source output enable signals SOE for SDIC1 and SOE for SDIC2. In this case, the pulse width of the fourth pulse S34 becomes greater by Δt than that of the fourth pulse S24 of the second source output enable signal SOE for SDIC2 (see FIG. 10).

The rising edge timing of at least some of the pulses S41 to S45 of the fourth source output enable signal SOE for SDIC4 is modulated to be faster than that of the third source output enable signal SOE for SDIC3. The falling edge timing of the pulses S41 to S45 of the fourth source enable signal SOE for SDIC4 is set equal to that of the first to third source output enable signals SOE for SDIC1 to SOE for SDIC3. The first pulse S41 of the fourth source output enable signal SOE for SDIC4 defines the output timing of the data voltage supplied to the data lines present in the portion B of the screen and the charge sharing timing of the data lines. The rising edge timing of the first pulse S41 of the fourth source output enable signal SOE for SDIC4 may be set faster by approximately Δt than that of the first pulse S31 of the third source output enable signal SOE for SDIC3. The falling edge timing of the first pulse S41 of the fourth source output enable signal SOE for SDIC4 may be set equal to that of the first pulses S11, S21, and S31 of the first to third source output enable signals SOE for SDIC1 to SOE for SDIC3. In this case, the pulse width of the first pulse S41 becomes greater by Δt than that of the first pulse S31 of the third source output enable signal SOE for SDIC3 (see FIGS. 9*b* and 10).

The rising edge timing of the second pulse S42 of the fourth source output enable signal SOE for SDIC4 may be set faster by approximately Δt than that of the second pulse S32 of the third source output enable signal SOE for SDIC3. The falling edge timing of the second pulse S42 of the fourth source output enable signal SOE for SDIC4 may be set equal to that of the second pulses S12, S22, and S32 of the first to third source output enable signals SOE for SDIC1 to SOE for SDIC3. In this case, the pulse width of the second pulse S42 becomes greater by Δt than that of the second pulse S32 of the third source output enable signal SOE for SDIC3 (see FIG. 10).

The rising edge timing of the third pulse S43 of the fourth source output enable signal SOE for SDIC4 may be set faster by approximately Δt than that of the third pulse S33 of the third source output enable signal SOE for SDIC3. The falling edge timing of the third pulse S43 of the fourth source output enable signal SOE for SDIC4 may be set equal to that of the third pulses S13, S23, and S33 of the first to third source output enable signals SOE for SDIC1 to SOE for SDIC3. In this case, the pulse width of the third pulse S43 becomes greater by Δt than that of the third pulse S33 of the third source output enable signal SOE for SDIC3 (see FIG. 10).

The fourth pulse S44 of the fourth source output enable signal SOE for SDIC4 defines the output timing of the data voltage supplied to the data lines present in the portion D of the screen and the charge sharing timing of the data lines. The rising edge timing of the fourth pulse S44 of the fourth source output enable signal SOE for SDIC4 may be set faster by approximately Δt than that of the fourth pulse S34 of the third source output enable signal SOE for SDIC3. The falling edge timing of the fourth pulse S44 of the fourth source output enable signal SOE for SDIC4 may be set equal to that of the fourth pulses S14, S24, and S34 of the first to third source output enable signals SOE for SDIC1 to SOE for SDIC3. In this case, the pulse width of the first pulse S44 becomes greater by Δt than that of the fourth pulse S34 of the third source output enable signal SOE for SDIC3 (see FIGS. 9*d* and 10).

By thusly modulating the source drive ICs SDIC1 to SDIC4, the power consumption and temperature of the source drive ICs SDIC to SDIC4 at all positions on the screen can be optimized. Also, the data charging characteristics TA to TD of the liquid crystal cells at all positions on the screen should be optimized to the same level. To this end, the timing controller TCON of the present invention modulates the gate output enable signal GOE as shown in FIG. 10 by taking the modulation timing of the source output enable signals SOE for SDIC1 to SOE for SDIC4 into account. Assuming that the pulse period of the source output enable signals SOE for SDIC1 to SOE for SDIC4 is T, the pulse period of the gate output enable signal GOE is modulated as shown in FIG. 10.

The pulse width of pulses G01 to G04 of the gate output enable signal GOE is set to be equal. The first pulse G01 of the gate output enable signal GOE overlaps with the first pulses S11, S21, S31, and S41 of the source output enable signals SOE for SDIC1 to SOE for SDIC4, and controls the output timing of the gate pulse supplied to the gate lines present in the portions A and B of the screen. A first pulse period between the rising edge of the first pulse G01 and the rising edge of the second pulse G02 is set to T−Δt (see FIGS. 9*a*, 9*b*, and 10).

The second pulse G02 of the gate output enable signal GOE overlaps with the second pulses S12, S22, S32, and S42 of the source output enable signals SOE for SDIC1 to SOE for SDIC4. A second pulse period between the rising edge of the second pulse G02 and the rising edge of the third pulse G03 may be set to be shorter than the first pulse period. For example, the second pulse period may be set to T−2Δt (see FIG. 10).

The third pulse G03 of the gate output enable signal GOE overlaps with the third pulses S13, S23, S33, and S43 of the source output enable signals SOE for SDIC1 to SOE for SDIC4. A third pulse period between the rising edge of the third pulse G03 and the rising edge of the fourth pulse G04 may be set to be shorter than the second pulse period. For example, the third pulse period may be set to T−3Δt (see FIG. 10).

The fourth pulse G04 of the gate output enable signal GOE overlaps with the fourth pulses S14, S24, S34, and S44 of the source output enable signals SOE for SDIC1 to SOE for SDIC4, and controls the output timing of the gate pulse supplied to the gate lines present in the portions C and D of the screen. A fourth pulse period between the rising edge of the fourth pulse G04 and the rising edge of the fifth pulse (not shown) may be set to be shorter than the third pulse period (see FIGS. 9*c*, 9*d*, and 10).

In FIGS. 9 and 10, Δt may be properly adjusted according to the panel characteristics of the liquid crystal display panel 10.

The timing controller TCON is able to increase the charge sharing time of the first, second, and fourth source drive ICs SDIC1, SDIC2, and SDIC4, as compared to FIG. 5, by modulating the source output enable signals SOE for SDIC1 to SOE for SDIC4 as shown in FIGS. 9 and 10. As a result, the power consumption and temperature of the first, second, and fourth source drive ICs SDIC1, SDIC2, and SDIC4 are minimized. Moreover, the timing controller TCON is able to uniformly control the data charging characteristics of the liquid crystal cells present at all positions of the screen by modulating the gate output enable signal GOE in accordance with the timing of the modulated source output enable signals SOE for SDIC1 to SOE for SDIC4.

In a single bank drive in which the gate drive ICs GDIC1 to GDIC4 are disposed on only one side of the liquid crystal display panel 10 and only one source printed circuit board SPCB is disposed, the timing controller TCON generates the first to fourth source output enable signals SOE for SDIC1 to SOE for SDIC4, respectively, in order to control the data output timing and charge share timing of the source drive ICs SDIC1 to SDIC4, respectively. As shown in FIG. 1, in a double bank drive in which the gate drive ICs GDIC1 to GDIC4 are disposed on two sides of the liquid crystal display panel 10 and two source printed circuit boards SPCB are disposed, the timing controller TCON is able to supply the first to fourth source output enable signals SOE for SDIC1 to SOE for SDIC4 to the source drive ICs SDIC1 to SDIC4 symmetrically disposed left and right, thereby generating a number of signals equal to half the number of the source drive ICs SDIC1 to SDIC4. As shown in FIG. 10, the timing controller TCON generates one gate output enable signal GOE and commonly supplies the gate output enable signal to the gate drive ICs GDIC1 to GDIC4.

FIG. 11 is a view showing a liquid crystal display according to another exemplary embodiment of the present invention to which a GIP circuit is applied.

Referring to FIG. 11, other components except for the gate drive circuit of the second exemplary embodiment of the present invention are substantially identical to those of the previous exemplary embodiment.

The gate drive circuit comprises a level shifter LS formed on the control printed circuit board CPCB and shift registers GIP1 and GIP2 directly formed on the TFT array substrate of the liquid crystal display panel. Accordingly, the source output enable signals SOE for SDIC1 to SOE for SDIC4 for controlling the source drive ICs SDIC1 to SDIC4 are substantially identical to those in FIGS. 9 and 10.

The level shifter LS shifts a high logic voltage of gate shift clocks GCLK1 input from the timing controller TCON during a low logic period of the gate output enable signal GOE to a gate high voltage VGH, and shifts a low logic voltage of the gate shift clocks GCLK1 to n to a gate low voltage VGL. The gate output enable signal GOE is substantially the same as FIG. 10.

The shift registers GIP1 and GIP2 shift a gate start pulse GSP input from the timing controller TCON in response to clock signals CLK input from the level shifter LS to sequentially supply a gate pulse to the gate lines of the liquid crystal display panel 10.

FIG. 12 is a circuit diagram showing in detail the level shifter LS shown in FIG. 11.

Referring to FIG. 12, the level shifter LS comprises a plurality of modulation circuits 121 to 126 for modulating the voltages of 6 phase gate shift clocks GCLK1 to GCLK6, respectively, and each of the modulation circuits 121 to 126 comprises an AND gate AND, transistors T1 and T2, etc. The modulation circuit may further comprise a transistor that modulates the gate high voltage VGH at the falling edge of the gate shift clocks GCLK1 to GCLK6 in response to a flicker control signal FLK. The first transistor T1 may be implemented as an n-type MOS TFT (Metal Oxide Semiconductor TFT), and the second transistor T2 may be implemented as a p-type MOS TFT.

The AND gate AND performs AND operation on the gate shift clocks GCLK1 to GCLK6 and an inversion signal produced by inverting the gate output enable signal GOE by an inverter INV and supplies the AND operation result to the gate electrodes of the first and second transistors T1 and T2.

The first transistor T1 supplies the gate high voltage VGH to an output node in response to the high logic voltage of the gate shift clocks GCLK1 to GCLK6 to raise the voltages of the clock signals CLK1 to CLK6 input to the shift registers GIP1 and GIP2 to the gate high voltage VGH. The first transistor T1 is turned off in response to the low logic voltage of the gate shift clocks GCLK1 to GCLK6. The gate high voltage VGH is applied to the source electrode of the first transistor T1, and the drain electrode of the first transistor T1 is connected to the output node of the level shifter LS. An output signal of the AND gate AND is applied to the gate electrode of the first transistor T1.

The second transistor T2 supplies the gate low voltage VGL to an output node of the level shifter LS in response to the low logic voltage of the gate shift clocks GCLK1 to GCLK6 to lower the voltages of the clock signals CLK2 to CLK6 to the gate low voltage VGL. The second transistor T2 is turned off in response to the high logic voltage of the gate shift clocks GCLK1 to GCLK6. An output signal of the AND gate AND is applied to the gate electrode of the second transistor T2. The drain electrode of the second transistor t2 is connected to the output node of the level shifter LS. The gate low voltage VGL is applied to the second transistor T2.

As described above, the present invention can modulate the timing of source output enable signals to a timing optimized for each of the source drive ICs. As a result, the power consumption and temperature of all the source drive ICs for driving the liquid crystal display panel can be optimized.

Although embodiments have been described with reference to a number of illustrative embodiments thereof, it should be understood that numerous other modifications and embodiments can be devised by those skilled in the art that, will fall within the scope of the principles of this disclosure. More particularly, numerous variations and modifications arc possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A liquid crystal display comprising:

a liquid crystal display panel having data lines and gate lines crossing each other and a matrix of liquid crystal cells arranged by the crossing structure of the lines, the liquid crystal display panel being divided into at least four portions including a first portion, a second portion, a third portion and a fourth portion, wherein the first and third portions are disposed in a left portion of the liquid crystal display panel and the second and fourth portions are disposed in a right portion of the liquid crystal display panel;

a first gate drive circuit that sequentially supplies a gate pulse to the gate lines present in the first portion and the second portion on the screen of the liquid crystal display panel in response to a gate output enable signal, wherein the second portion is apart from the first portion in a horizontal direction;

a second gate drive circuit that sequentially supplies the gate pulse to the gate lines present in the third portion and the fourth portion on the screen of the liquid crystal display panel in response to the gate output enable signal, wherein the third portion is apart from the first portion in a vertical direction, and the fourth portion is apart from the third portion in the horizontal direction;

a first data drive circuit that supplies a data voltage to the data lines present in the first portion and the third portion on the screen of the liquid crystal display panel in response to a first source output enable signal;

a second data drive circuit that supplies the data voltage to the data lines present in the second portion and the fourth portion below the second portion on the screen of the liquid crystal display panel in response to a second source output enable signal; and a timing controller that generates the gate output enable signal, the first source output enable signal, and the second source output enable signal to control the gate pulse output timing of the gate drive circuits and the data voltage output timing and charge sharing timing of the data drive circuits, wherein the first source output enable signal controls the data voltage output timing and charge sharing timing of the first data drive circuit, and the second source output enable signal controls the data voltage output timing and charge sharing timing of the second data drive circuit in a different way from the first data drive circuit, wherein at least some of data output channels of the first data drive circuit for the data lines in the first and third portions are connected during the charge sharing timing of the first data drive circuit and are disconnected to supply the data voltage to the data lines in the first and third portions during the data voltage output timing of the first data drive circuit, and wherein at least some of data output channels of the second data drive circuit for the data lines in the second and fourth portions are connected during the charge sharing timing of the second data drive circuit and are disconnected to supply the data voltage to the data lines in the second and fourth portions during the data voltage output timing of the second data drive circuit.

2. The liquid crystal display of claim 1, wherein a rising edge of the second source output enable signal is prior to that of the first source output enable signal.

3. The liquid crystal display of claim 1, wherein the first source output enable signal comprises a first pulse and a second pulse having a smaller width than that of the first pulse.

4. The liquid crystal display of claim 3, wherein the first data drive circuit shares charges of the data lines present in the first portion in response to the first pulse of the first source output enable signal, and outputs the data voltage to the data lines present in the first portion during a low logic period after the first pulse, and the first data drive circuit shares charges of the data lines present in the third portion in response to the second pulse of the first source output enable signal, and outputs the data voltage to the data lines present in the third portion during a low logic period after the second pulse.

5. The liquid crystal display of claim 4, wherein the second source output enable signal comprises a first pulse that has a rising edge prior to that of the first pulse of the first source output enable signal and overlaps with the first pulse of the first source output enable signal and a second pulse that has a rising edge prior to that of the second pulse of the first source output enable signal and overlaps with the second pulse of the first source output enable signal.

6. The liquid crystal display of claim 5, wherein the second data drive circuit shares charges of the data lines present in the second portion in response to the first pulse of the second source output enable signal, and outputs the data voltage to the data lines present in the second portion during a low logic period after the first pulse, and the second data drive circuit shares charges of the data lines present in the fourth portion in response to the second pulse of the second source output enable signal, and outputs the data voltage to the data lines present in the fourth portion during a low logic period after the second pulse.

7. The liquid crystal display of claim 6, wherein the pulse width of the second pulse of the second source output enable signal is smaller than that of the first pulse of the second source output enable signal.

8. The liquid crystal display of claim 1, wherein the gate output enable signal comprises first and second pulses having the same pulse width, each of the first and second pulses respectively overlap with first pulse and second pulses of the first source output enable signal.

9. The liquid crystal display of claim 8, wherein an interval between rising edges of the first and second pulses of the gate output enable signal is shorter than an interval between rising edges of the first and second pulses of the first source output enable signal.

10. The liquid crystal display of claim 9, wherein the first gate drive circuit outputs the gate pulse to the gate lines present in the first and second portions during a low logic period after the first pulse of the gate output enable signal, and the second gate drive circuit outputs the gate pulse to the gate lines present in the third and fourth portions during a low logic period after the second pulse of the gate output enable signal.

11. The liquid crystal display of claim 8, wherein the rising edges of the first and second pulses of the gate output enable signal is respectively prior to the rising edges of the first and second pulses of the first source output enable signal.

12. The liquid crystal display of claim 7, wherein falling edge timings of the first and second pulses of the second source output enable signal are modulated such that a width of the second pulse is smaller than that of the first pulse.

13. The liquid crystal display of claim 7, wherein the width of the second pulse of the second source output enable signal is longer than the width of the first pulse of the second source output enable signal by an amount by which the rising edge of the second source output enable signal is prior to that of the first source output enable signal.

14. The liquid crystal display of claim 3, wherein falling edge timings of the first and second pulses of the first source output enable signal are modulated such that a width of the second pulse is smaller than that of the first pulse.

15. The liquid crystal display of claim 3, wherein the width of the second pulse of the first source output enable signal is longer than the width of the first pulse of the first source output enable signal by an amount by which the rising edge of the second source output enable signal is prior to that of the first source output enable signal.

16. The liquid crystal display of claim 2, wherein a falling edge timing of the second source output enable signal is same as that of the first source output enable signal.

17. The liquid crystal display of claim 2, wherein widths of pulses comprised in the second source output enable signal are respectively longer than widths of corresponding pulses comprised in the first source output enable signal.

18. The liquid crystal display of claim 17, wherein the widths of the pulses comprised in the second source output enable signal are respectively longer than the widths of the corresponding pulses comprised in the first source output enable signal by an amount by which the rising edge of the second source output enable signal is prior to that of the first source output enable signal.

19. The liquid crystal display of claim 1, wherein during the charge sharing time of the first and second data drive circuits, the data voltages of opposite polarities are supplied to neighboring data lines such that the data lines are controlled to have an average voltage of a positive data voltage and a negative data voltage.

20. The liquid crystal display of claim 1, wherein the first source output enable signal is in a high logic during the charge sharing timing of the first data drive circuit and is in a low logic period during the data voltage output timing of the first data drive circuit, and wherein the second source output enable signal is in a high logic during the charge sharing timing of the second data drive circuit and is in a low logic during the data voltage output timing of the second drive circuit.

* * * * *